US010045249B2

(12) United States Patent
Lee et al.

(10) Patent No.: US 10,045,249 B2
(45) Date of Patent: Aug. 7, 2018

(54) METHOD AND APPARATUS FOR CONFIGURING BUFFER STATUS REPORT FOR PUBLIC SAFETY TRANSMISSION OR VEHICLE-RELATED TRANSMISSION IN WIRELESS COMMUNICATION SYSTEM

(71) Applicant: LG Electronics Inc., Seoul (KR)

(72) Inventors: Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 15/121,308

(22) PCT Filed: Mar. 19, 2015

(86) PCT No.: PCT/KR2015/002683
§ 371 (c)(1),
(2) Date: Aug. 24, 2016

(87) PCT Pub. No.: WO2015/142082
PCT Pub. Date: Sep. 24, 2015

(65) Prior Publication Data
US 2017/0019812 A1  Jan. 19, 2017

Related U.S. Application Data

(60) Provisional application No. 61/955,780, filed on Mar. 19, 2014.

(51) Int. Cl.
*H04W 28/02* (2009.01)
*H04W 24/02* (2009.01)
(Continued)

(52) U.S. Cl.
CPC ....... *H04W 28/0278* (2013.01); *H04W 4/046* (2013.01); *H04W 24/02* (2013.01);
(Continued)

(58) Field of Classification Search
CPC ........... H04W 28/0278; H04W 76/023; H04W 24/02; H04W 72/1284; H04W 72/0413; H04W 72/04
See application file for complete search history.

(56) References Cited

U.S. PATENT DOCUMENTS

2009/0285104 A1  11/2009  Tseng
2010/0098011 A1   4/2010  Pelletier et al.
(Continued)

OTHER PUBLICATIONS

RP-141015: 3GPP TSG RAN Meeting #64, Qualcomm Incorporated, Sophia Antipolis, France, "Status Report to TSG," Jun. 10, 2014, pp. 1-25, XP055391012.
(Continued)

*Primary Examiner* — Jamal Javaid
(74) *Attorney, Agent, or Firm* — Dentons US LLP

(57) ABSTRACT

A method and apparatus for configuring a buffer status report (BSR) for a public safety transmission or a vehicle-related (V2X) transmission in a wireless communication system is provided. A user equipment (UE) configures a device-to-device (D2D) logical channel corresponding to the public safety transmission or the V2X transmission, and triggers a proximity-based services (ProSe) BSR for the D2D logical channel. The UE accommodates the triggered ProSe BSR in a media access control (MAC) protocol data unit (PDU) if the MAC PDU can accommodate only one BSR MAC control element (CE).

13 Claims, 17 Drawing Sheets

(51) Int. Cl.
    *H04W 4/04*         (2009.01)
    *H04W 76/02*       (2009.01)
    *H04W 72/12*       (2009.01)
    *H04W 4/02*         (2018.01)
    *H04W 4/22*         (2009.01)
    *H04W 76/00*       (2018.01)
    *H04W 4/00*         (2018.01)

(52) U.S. Cl.
    CPC ..... *H04W 72/1284* (2013.01); *H04W 76/023* (2013.01); *H04W 4/005* (2013.01); *H04W 4/02* (2013.01); *H04W 4/22* (2013.01); *H04W 76/007* (2013.01)

(56) References Cited

U.S. PATENT DOCUMENTS

2013/0322413 A1   12/2013   Pelletier et al.
2014/0010179 A1    1/2014   Lee
2016/0295624 A1* 10/2016   Novlan ................ H04W 72/02

OTHER PUBLICATIONS

Renesas Mobile Europe Ltd., "ProSe scenarios and use cases," R2-132652, 3GPP TSG-RAN WG2 Meeting #83, Aug. 19-23, 2013.
Samsung, "Logical channel prioritizatin in 1A and 3C," R2-133822, 3GPP TSG RAN WG2 Meeting #84, Nov. 11-15, 2013.

* cited by examiner

METHOD AND APPARATUS FOR CONFIGURING BUFFER STATUS REPORT FOR PUBLIC SAFETY TRANSMISSION OR VEHICLE-RELATED TRANSMISSION IN WIRELESS COMMUNICATION SYSTEM

This application is a 35 USC § 371 National Stage entry of International Application No. PCT/KR2015/002683 filed on Mar. 19, 2015, and claims priority to U.S. Provisional Application Nos. 61/955,780 filed Mar. 19, 2014, all of which are hereby incorporated by reference in their entireties as if fully set forth herein.

BACKGROUND OF THE INVENTION

Field of the Invention

The present invention relates to wireless communications, and more particularly, to a method and apparatus for configuring a buffer status report (BSR) for a public safety transmission or vehicle-related (V2X) transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

A buffer status reporting (BSR) procedure is used to provide the serving eNB (evolved NodeB) with information about the amount of data available for transmission in the uplink (UL) buffers of the UE. As ProSe is introduced in 3GPP LTE rel-12, BSR for ProSe may be newly defined. Accordingly, various operations related to the BSR for ProSe should be newly defined.

SUMMARY OF THE INVENTION

The present invention provides a method and apparatus for configuring a buffer status report (BSR) for a public safety transmission or a vehicle-related (V2X) transmission in a wireless communication system. The present invention provides a method for prioritizing a proximity-based services (ProSe) BSR for the public safety transmission or the V2X transmission over other BSRs. The present invention provides a method for determining autonomously priorities of D2D logical channels.

In an aspect, a method for configuring, by a user equipment (UE), a buffer status report (BSR) for a public safety transmission or a vehicle-related (V2X) transmission in a wireless communication system is provided. The method includes configuring, by the UE, a device-to-device (D2D) logical channel corresponding to the public safety transmission or the V2X transmission, triggering, by the UE, a proximity-based services (ProSe) BSR for the D2D logical channel, and accommodating, by the UE, the triggered ProSe BSR in a media access control (MAC) protocol data unit (PDU) if the MAC PDU can accommodate only one BSR MAC control element (CE).

In another aspect, a user equipment (UE) configured to configure a buffer status report (BSR) for a public safety transmission or a vehicle-related (V2X) transmission in a wireless communication system is provided. The UE includes a radio frequency (RF) unit configured to transmit or receive a radio signal, and a processor coupled to the RF unit, and configured to configure a device-to-device (D2D) logical channel corresponding to the public safety transmission or the V2X transmission, trigger a proximity-based services (ProSe) BSR for the D2D logical channel, and accommodate the triggered ProSe BSR in a media access control (MAC) protocol data unit (PDU) if the MAC PDU can accommodate only one BSR MAC control element (CE).

In another aspect, a method for determining, by a user equipment (UE), priorities of device-to-device (D2D) logical channels in a wireless communication system is provided. The method includes determining, by the UE, autonomously the priorities of the D2D logical channels, if the network does not configure the priorities of the D2D logical channels, or if a UE is an idle mode or out of network coverage, and transmitting, by the UE, the determined priorities of the D2D logical channels to other UEs.

ProSe BSR for public safety transmission and V2X transmission can be prioritized.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
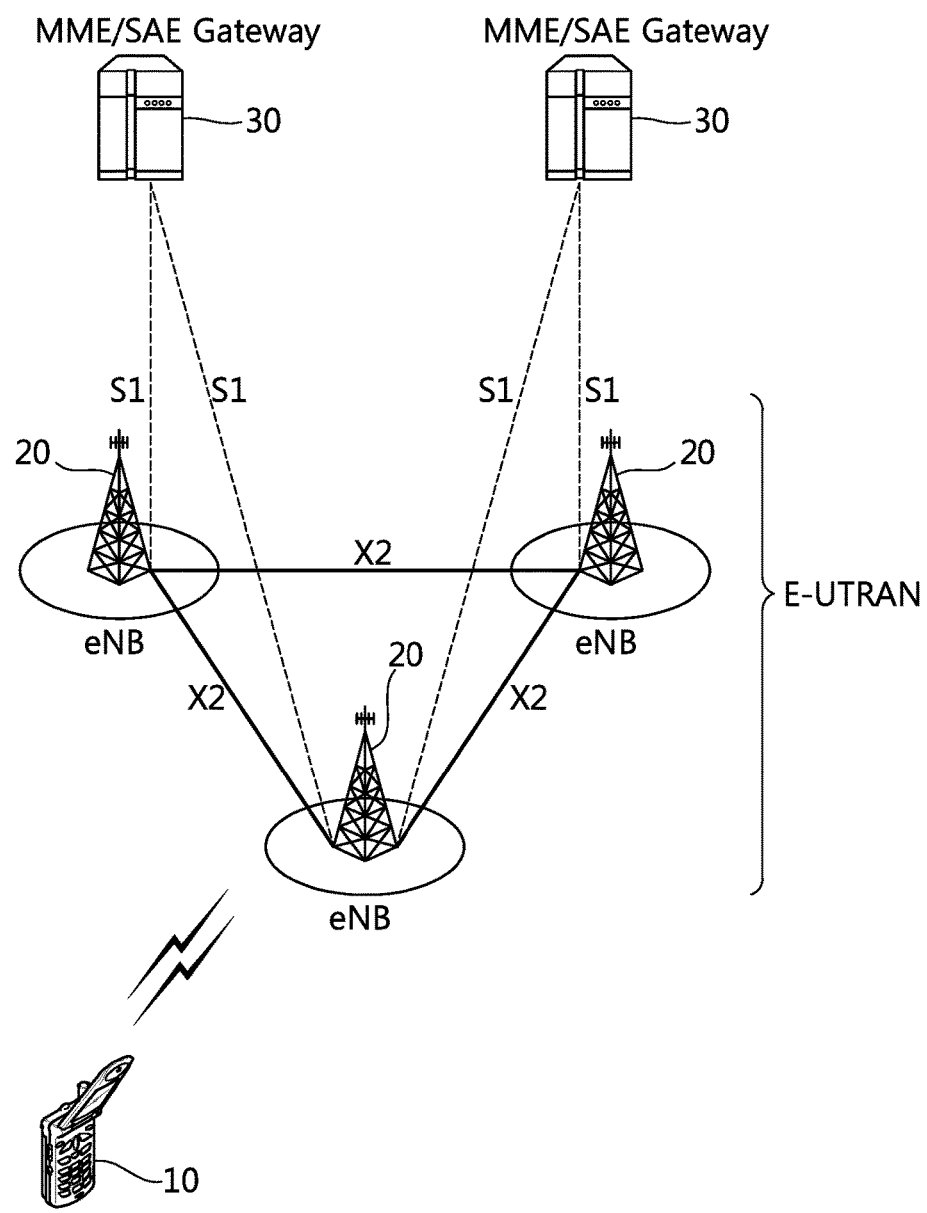
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
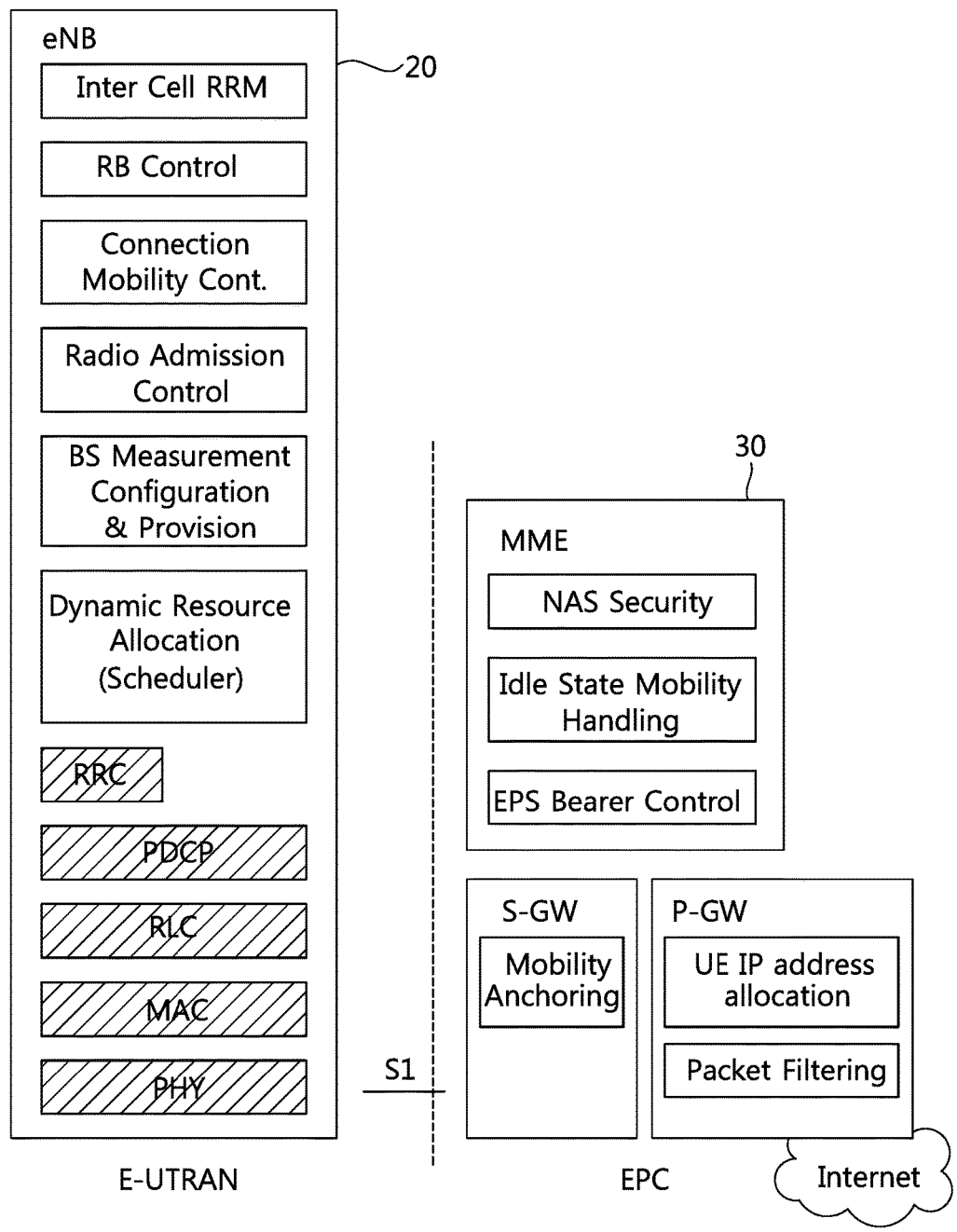
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
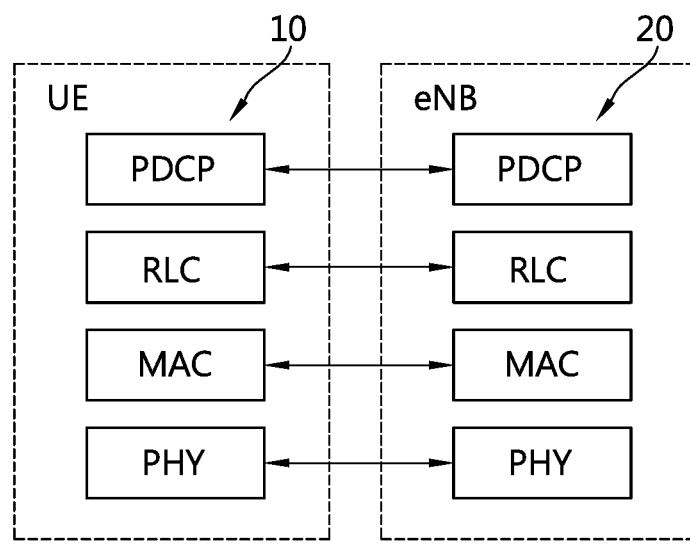
FIG. 3 shows a block diagram of a user plane protocol stack of an LTE system.
Figure 4:
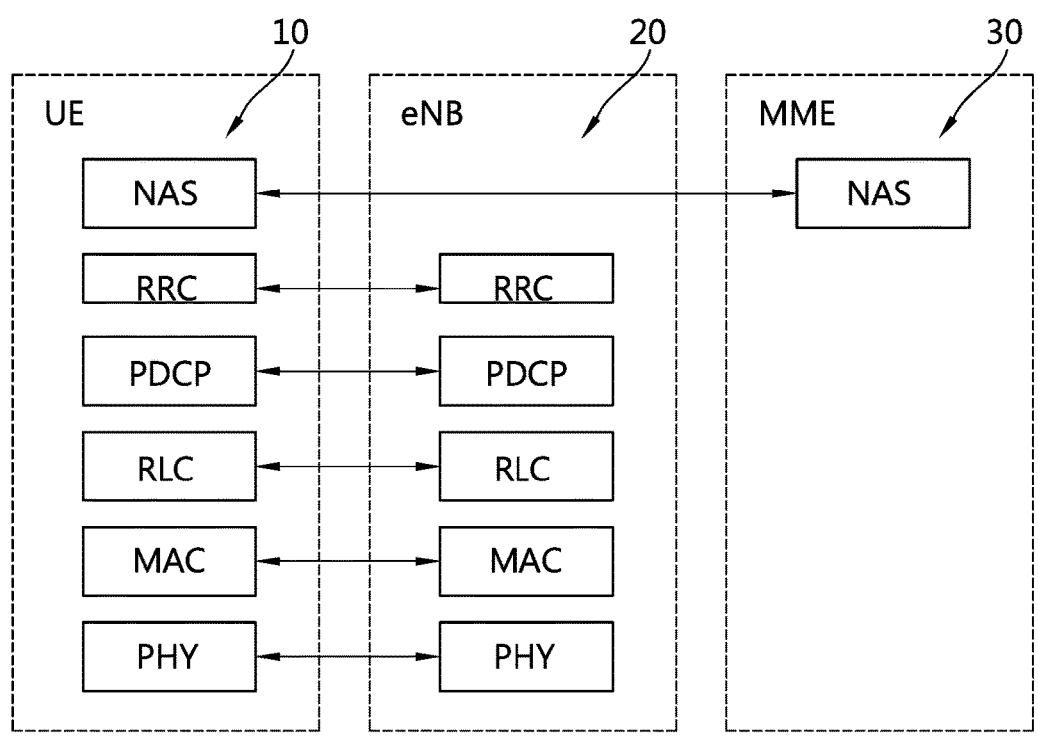
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
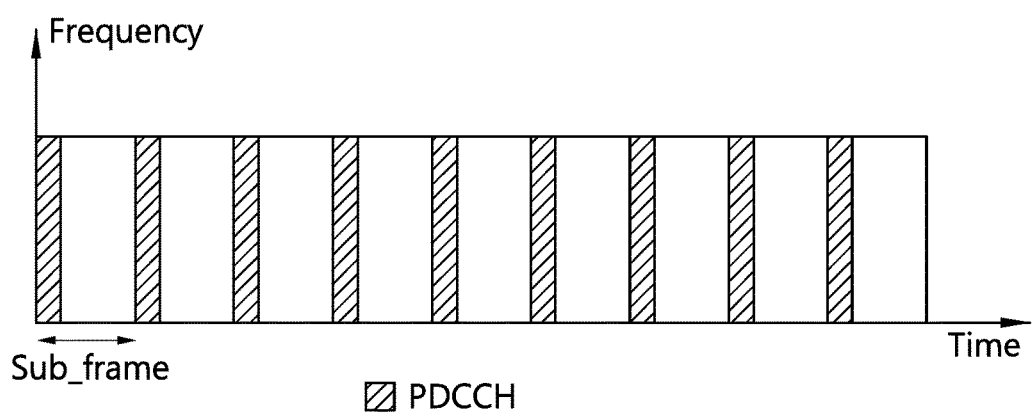
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

Figure 6:
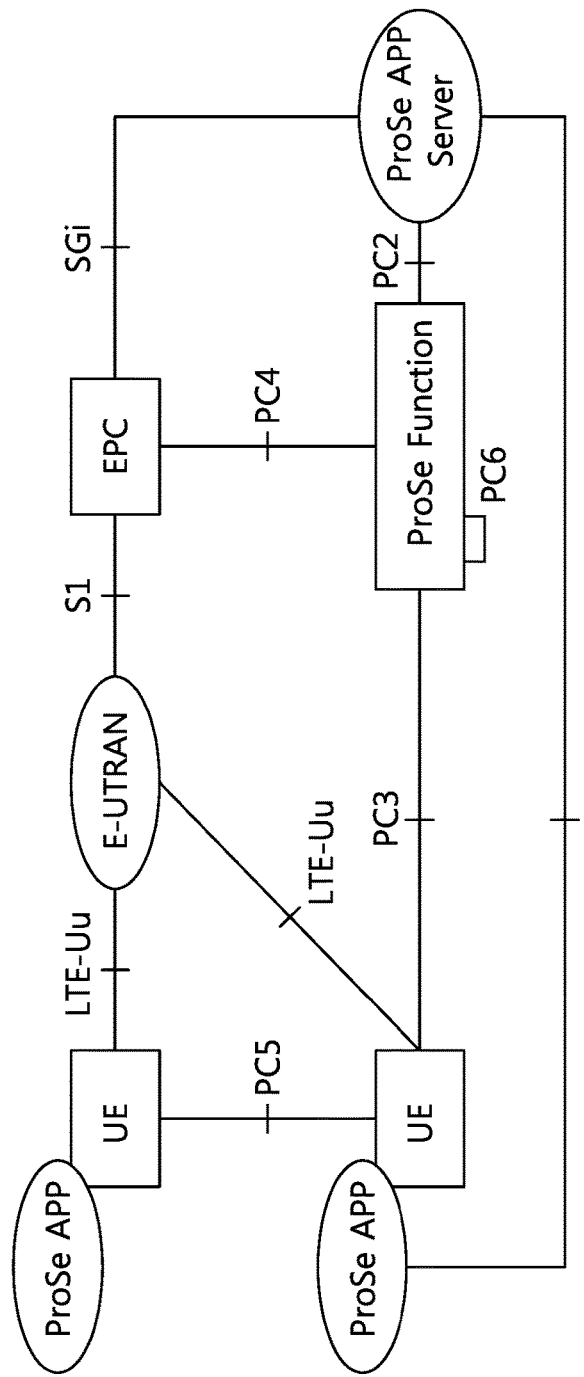
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications

Authorization and configuration of the UE for discovery and direct communication Enable the functionality of the EPC level ProSe discovery ProSe related new subscriber data and handling of data storage, and also handling of ProSe identities Security related functionality Provide control towards the EPC for policy related functionality Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signaling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

The following use cases are relevant for public safety (PS) ProSe communication.

Little or no coverage: Guaranteed communications through the network cannot be achieved either because of attenuation due to the local environment, the mobility of the users, or a simple lack of coverage. In these situations, the priority is to maintain communications with those at the incident, e.g., in buildings, on trains, between vehicles, in rural environments, underground.

Fall back: Used when there has been a complete network failure in an area that would typically have coverage, e.g., large scale natural disasters, power cuts, equipment failures.

Extra capacity: Used to provide extra capacity to manage some incidents. In existing systems, there are certain system constraints that limit the number of groups and group members that can operate in an area, so the ability to communicate directly can provide extra capacity, e.g., large metropolitan areas.

Local communication requirement: This is used in scenarios where there is no need to connect back to a control room or dispatch.

Coverage: device to device E-UTRA communication for PS ProSe-enabled UEs is needed among in-network-coverage UEs, out-of-network-coverage UEs and a mixture of UEs in and out of network coverage. Determination is needed regarding within the device to device ProSe communication which user(s) are in device to device ProSe communication-coverage at any given time. Maintaining concurrent device to device ProSe communication (off-network) and LTE connectivity is required regardless of whether UEs are in network coverage or out-of-network-coverage. The LTE connectivity for out-of-network-coverage UEs are provided via UE-to-network relays Spectrum: PS device-to-device ProSe discovery and communication can be operated on PS ProSe specific carrier, or on a carrier also used for LTE network coverage.

Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 7:
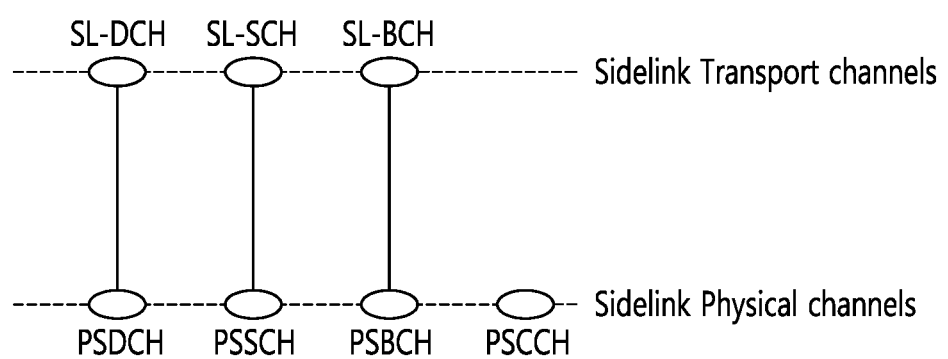
FIG. 7 shows an example of mapping between sidelink transport channels and sidelink physical channels.

FIG. 7 shows an example of mapping between sidelink transport channels and sidelink physical channels. Referring to FIG. 7, a physical sidelink discovery channel (PSDCH), which carries ProSe direct discovery message from the UE, may be mapped to a sidelink discovery channel (SL-DCH). The SL-DCH is characterized by:

fixed size, pre-defined format periodic broadcast transmission;

support for both UE autonomous resource selection and scheduled resource allocation by eNB;

collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:

support for broadcast transmission;

support for both UE autonomous resource selection and scheduled resource allocation by eNB;

collision risk due to support of UE autonomous resource selection; no collision when UE is allocated dedicated resources by the eNB;

support for HARQ combining, but no support for HARQ feedback;

support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

Figure 8:
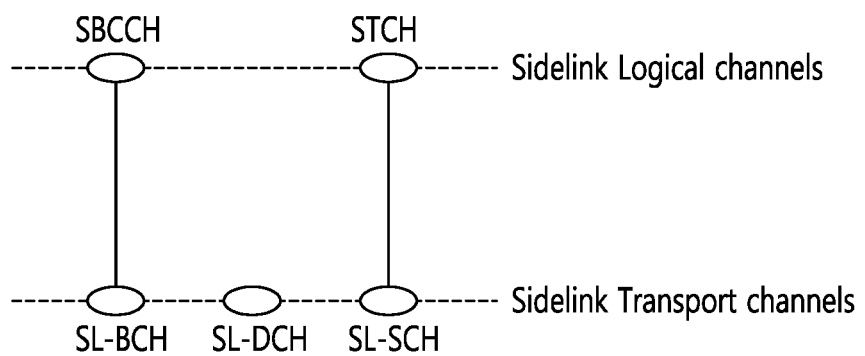
FIG. 8 shows an example of mapping between sidelink logical channels and sidelink transport channels for ProSe direct communication.

FIG. 8 shows an example of mapping between sidelink logical channels and sidelink transport channels for ProSe direct communication. Referring to FIG. 8, the SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

Buffer status reporting is described. It may be referred to Section 5.4.5 of 3GPP TS 36.321 V12.0.0 (2013-12). RRC controls BSR reporting by configuring the two timers periodicBSR-Timer and retxBSR-Timer and by, for each logical channel, optionally signaling logicalChannelGroup which allocates the logical channel to n logical channel group (LCG). For the buffer status reporting procedure, the UE shall consider all radio bearers which are not suspended and may consider radio bearers which are suspended.

A BSR shall be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "regular BSR";

UL resources are allocated and number of padding bits is equal to or larger than the size of the BSR MAC control element (CE) plus its subheader, in which case the BSR is referred below to as "padding BSR";

retxBSR-Timer expires and the UE has data available for transmission for any of the logical channels which belong to a LCG, in which case the BSR is referred below to as "regular BSR";

periodicBSR-Timer expires, in which case the BSR is referred below to as "periodic BSR".

For regular and periodic BSR:

if more than one LCG has data available for transmission in the TTI where the BSR is transmitted: report long BSR;

else report short BSR.

For padding BSR:

1> if the number of padding bits is equal to or larger than the size of the short BSR plus its subheader but smaller than the size of the long BSR plus its subheader, 2> if more than one LCG has data available for transmission in the TTI where the BSR is transmitted: report truncated BSR of the LCG with the highest priority logical channel with data available for transmission;

2> else report short BSR.

1> else if the number of padding bits is equal to or larger than the size of the long BSR plus its subheader, report long BSR.

If the buffer status reporting procedure determines that at least one BSR has been triggered and not cancelled:

1> if the UE has UL resources allocated for new transmission for this TTI:

2> instruct the multiplexing and assembly procedure to generate the BSR MAC CE(s);

2> start or restart periodicBSR-Timer except when all the generated BSRs are truncated BSRs;

2> start or restart retxBSR-Timer.

1> else if a regular BSR has been triggered:
2> if an uplink grant is not configured or the regular BSR was not triggered due to data becoming available for transmission for a logical channel for which logical channel SR masking (logicalChannelSR-Mask) is setup by upper layers:
3> a SR shall be triggered.

A MAC PDU shall contain at most one MAC BSR CE, even when multiple events trigger a BSR by the time a BSR can be transmitted in which case the regular BSR and the periodic BSR shall have precedence over the padding BSR. The UE shall restart retxBSR-Timer upon indication of a grant for transmission of new data on any UL-SCH. All triggered BSRs shall be cancelled in case the UL grant(s) in this subframe can accommodate all pending data available for transmission but is not sufficient to additionally accommodate the BSR MAC CE plus its subheader. All triggered BSRs shall be cancelled when a BSR is included in a MAC PDU for transmission. The UE shall transmit at most one regular/periodic BSR in a TTI. If the UE is requested to transmit multiple MAC PDUs in a TTI, it may include a padding BSR in any of the MAC PDUs which do not contain a regular/periodic BSR. All BSRs transmitted in a TTI always reflect the buffer status after all MAC PDUs have been built for this TTI. Each LCG shall report at the most one buffer status value per TTI and this value shall be reported in all BSRs reporting buffer status for this LCG. A padding BSR is not allowed to cancel a triggered regular/periodic BSR. A padding BSR is triggered for a specific MAC PDU only and the trigger is cancelled when this MAC PDU has been built.

Figure 9:
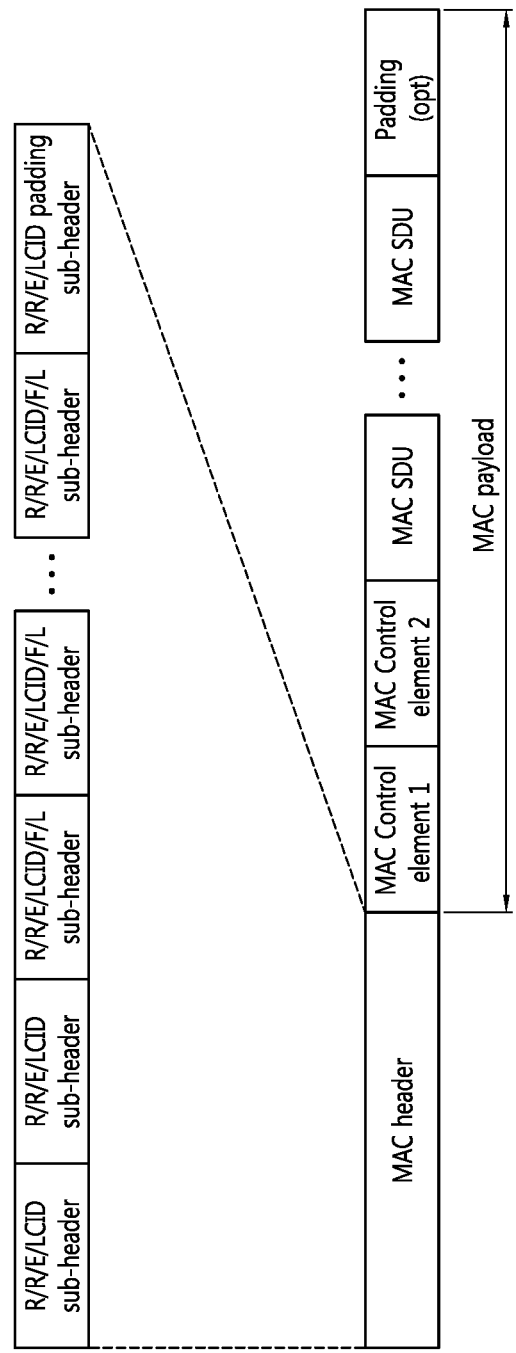
FIG. 9 shows an example of a MAC PDU.

FIG. 9 shows an example of a MAC PDU. A MAC PDU consists of a MAC header, zero or more MAC CEs, zero or more MAC service data units (SDUs), and optionally padding. Both the MAC header and the MAC SDUs are of variable sizes.

Figure 10:
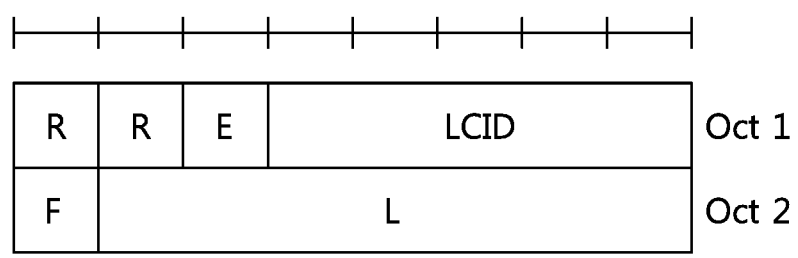
FIG. 10 to FIG. 12 shows an example of a MAC PDU subheader. A MAC PDU header consists of one or more MAC PDU subheaders.
Figure 11:
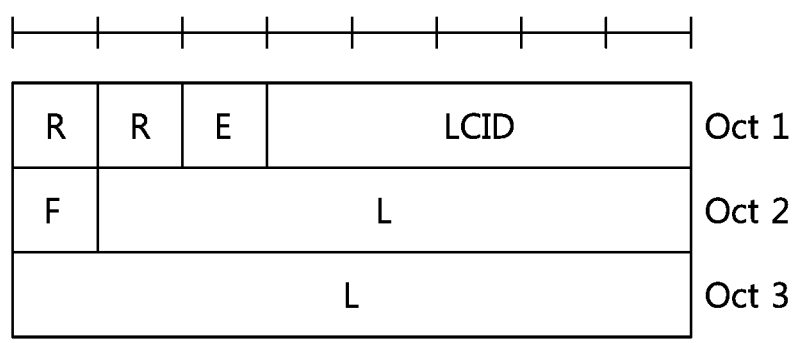
Figure 12:
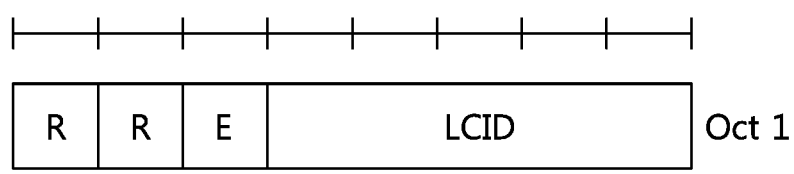

FIG. 10 to FIG. 12 shows an example of a MAC PDU subheader. A MAC PDU header consists of one or more MAC PDU subheaders. Each subheader corresponds to either a MAC SDU, a MAC CE or padding. A MAC PDU subheader consists of the six header fields R/R/E/LCID/F/L but for the last subheader in the MAC PDU and for fixed sized MAC CEs. FIG. 10 shows R/R/E/LCID/F/L MAC PDU subheader with 7-bits L field. FIG. 11 shows R/R/E/LCID/F/L MAC PDU subheader with 15-bits L field. The last subheader in the MAC PDU and subheaders for fixed sized MAC CEs consist solely of the four header fields R/R/E/LCID. A MAC PDU subheader corresponding to padding consists of the four header fields R/R/E/LCID. FIG. 12 shows R/R/E/LCID MAC PDU subheader. MAC PDU subheaders have the same order as the corresponding MAC SDUs, MAC CEs and padding.

MAC CEs are always placed before any MAC SDU. Padding occurs at the end of the MAC PDU, except when single-byte or two-byte padding is required. Padding may have any value and the UE shall ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per UE. A maximum of one MCH MAC PDU can be transmitted per TTI.

Figure 13:
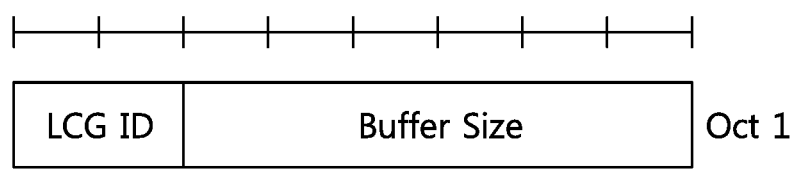
FIG. 13 and FIG. 14 show an example of a BSR MAC CE.
Figure 14:
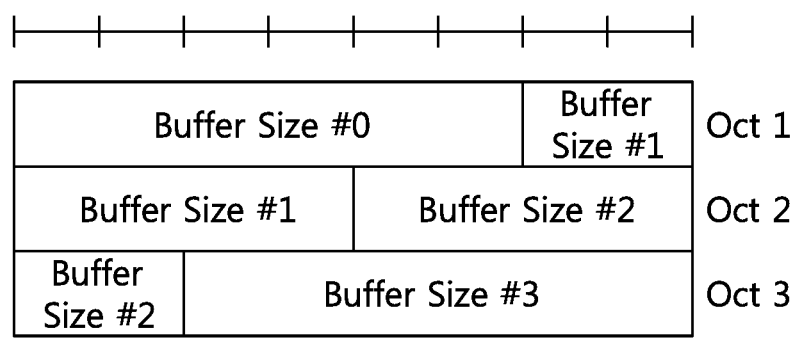

FIG. 13 and FIG. 14 show an example of a BSR MAC CE. FIG. 13 shows a short BSR and truncated BSR MAC CE, which includes one LCG ID field and one corresponding buffer size field. FIG. 14 shows a long BSR MAC CE, which includes four buffer size fields, corresponding to LCG IDs #0 through #3. The BSR formats are identified by MAC PDU subheaders with LCIDs. The fields LCG ID and buffer size are defined as follow:

LCG ID: The logical channel group ID field identifies the group of logical channel(s) which buffer status is being reported. The length of the field is 2 bits.

Buffer size: The buffer size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. If extendedBSR-Sizes is not configured, the values taken by the buffer size field are shown in Table 1 below. If extendedBSR-Sizes is configured, the values taken by the buffer size field are shown in Table 2 below.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |

TABLE 1-continued

| Index | Buffer Size (BS) value [bytes] |
|---|---|
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |

TABLE 2-continued

| Index | Buffer Size (BS) value [bytes] |
|---|---|
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

As the Prose (and/or D2D) is introduced in 3GPP LTE rel-12, BSR for Prose (hereinafter, ProSe BSR) may be newly defined. Accordingly, various operations related to the ProSe BSR may be also newly defined. For example, the UE may transmit a scheduling request (SR) (dedicated SR (D-SR) or random access (RA)) to the eNB followed by the BSR based on which the eNB can determine that the UE intends to perform the D2D transmission as well as the required amount resources.

As described above, the MAC PDU may contain at most one MAC BSR CE, even when multiple events trigger a BSR by the time a BSR can be transmitted. According to the prior art, if there is one BSR for data to be transmitted over Uu interface in uplink and there is another BSR for D2D data, which corresponds to public safety data transmission and/or vehicle-related (V2X) transmission, to be transmitted over direct interface between UEs, but if a MAC PDU can only accommodate a single BSR, the UE cannot determine which BSR should be transmitted. In this case, even though the public safety transmission and/or V2X transmission is normally delay sensitive, the BSR for public safety transmission and/or V2X transmission may be delayed due to the BSR for uplink transmission over Uu interface.

In order to solve the problem described above, a method for determining priorities of BSRs according to an embodiment of the present invention is described below. According to an embodiment of the present invention, ProSe BSR for public safety transmission and/or V2X transmission is prioritized over other BSRs, including BSRs for uplink transmission and other D2D transmission. It is assumed that the following UE MAC operation happens in a MAC entity configured in a UE for DL/UL transmission from/to the eNB. There is another MAC entity configured for D2D transmission and reception in this UE. It is further assumed that a D2D logical channel between a RLC entity and a MAC entity dedicated to D2D is defined for D2D transmission over direct interface among UEs.

Figure 15:
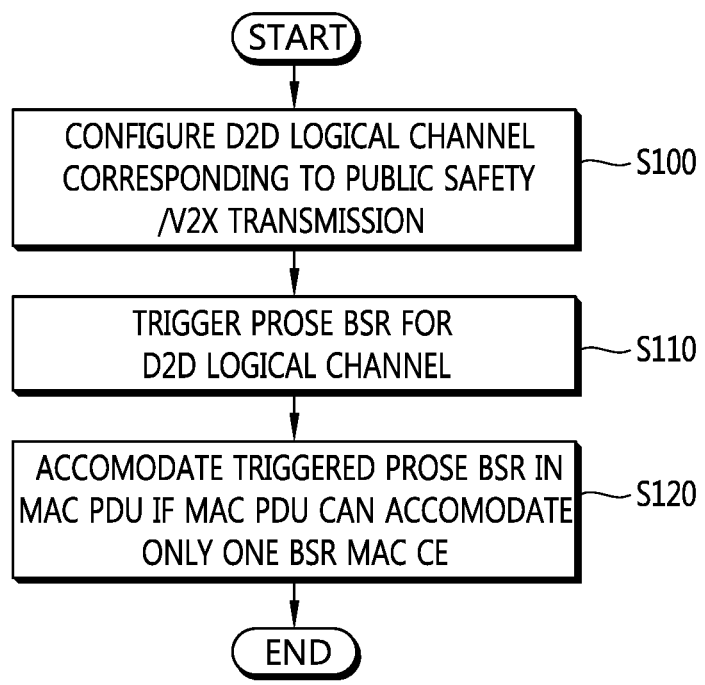
FIG. 15 shows an example of a method for configuring a BSR for a public safety transmission or a V2X transmission according to an embodiment of the present invention.

FIG. 15 shows an example of a method for configuring a BSR for a public safety transmission or a V2X transmission according to an embodiment of the present invention. The V2X transmission may further include, e.g. vehicle-to-vehicle (V2V), vehicle-to-pedestrians (V2P), or vehicle-to-infrastructure (V2I) transmission. In step S100, the UE configures one or more D2D logical channel corresponding to the public safety transmission or the V2X transmission, for transmission over the direct interface between UEs. Further, one or more logical channel for transmission over the radio interface with the network may be further configured. In step S110, the UE triggers the ProSe BSR for the D2D logical channel. The ProSe BSR reflects buffer status of the D2D logical channel corresponding to the public safety transmission or V2X transmission. The UE may consider that the D2D logical channel corresponding to the public safety transmission or V2X transmission has a higher logical channel priority than other D2D logical channels, regardless of network configuration. In step S120, the UE accommodates the triggered ProSe BSR in a MAC PDU, while not accommodating any other BSRs, if the MAC PDU can accommodate only one BSR MAC CE.

According to an embodiment of the present invention, the buffer status reporting procedure may be used to provide the serving eNB with information about the amount of data available for transmission in the UL buffers of the UE and the amount of data available for D2D transmission in the D2D buffers of the UE. RRC may control BSR reporting by configuring the two timers periodicBSR-Timer and retxBSR-Timer for uplink transmission over Uu and another two timers periodicD2DBSR-Timer and retxD2DBSR-Timer for D2D transmission, and by, for each logical channel, optionally signaling logicalChannelGroup which allocates the logical channel to an LCG. RRC may optionally signal D2DlogicalChannelGroup, for each D2D logical channel, which allocates the D2D logical channel to an LCG (i.e. D2D-LCG). RRC in eNB may signal D2DlogicalChannelGroup, for each D2D logical channel, to the UE. For the buffer status reporting procedure, the UE may consider all radio bearers, including all D2D radio bearers over direct interface among UEs, which are not suspended and may consider radio bearers which are suspended. All D2D radio bearers may be never suspended. Alternatively, the eNB may indicate to the UE which D2D radio bearer is suspended.

According to an embodiment of the present invention, a BSR shall be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "regular BSR";

D2D data, for a D2D logical channel (which belongs to a LCG), becomes available for D2D transmission in the RLC entity or in the PDCP entity and either the data belongs to a D2D logical channel with higher priority than the priorities of the logical channels which belong to any LCG and for which data is already available for transmission, or there is no data available for transmission for any of the logical channels (which belong to a LCG), in which case the BSR is referred below to as "regular BSR" for ProSe (the highest priority over all logical channels for both Uu and D2D is assigned (e.g. either by the network or autonomously by the UE) to a logical channel configured for public safety communication such as mission critical voice or V2X transmission);

UL resources are allocated and number of padding bits is equal to or larger than the size of the buffer status report MAC CE plus its subheader, in which case the BSR is referred below to as "padding BSR";

retxBSR-Timer expires and the UE has data available for uplink transmission over Uu for any of the logical channels which belong to a LCG, in which case the BSR is referred below to as "Regular BSR";

retxD2DBSR-Timer expires and the UE has data available for D2D transmission for any of the logical channels (which belong to a LCG), in which case the BSR is referred below to as "regular BSR" for ProSe;

periodicBSR-Timer expires, in which case the BSR (related to uplink transmission over Uu) is referred below to as "periodic BSR";

periodicD2DBSR-Timer expires, in which case the BSR (related to D2D transmission) is referred below to as "periodic BSR" for ProSe.

For regular and periodic BSR for uplink transmission over Uu and D2D transmission:

if more than one LCG has data available for uplink transmission and/or for D2D transmission in the TTI where the BSR is transmitted: report long BSR;

else report short BSR.

According to an embodiment of the present invention, for padding BSR:

1> if a ProSe BSR reflects buffer status of one or more D2D logical channels corresponding to public safety transmission or V2X transmission, or if a ProSe BSR reflects buffer status of a D2D logical channel with the highest logical channel priority, and if the number of padding bits is equal to or larger than the size of the ProSe BSR plus its subheader:

2> if more than one D2D-LCG has data available for D2D transmission: report truncated BSR of the LCG with either "D2D logical channel for public safety transmission or V2X transmission" or "the highest priority logical channel" with data available for D2D transmission;

2> else report short BSR for ProSe or long BSR for ProSe, depending on the number of padding bits.

And then,

1> if the number of remaining padding bits after the BSR reported for D2D transmission is equal to or larger than the size of the short BSR plus its subheader but smaller than the size of the long BSR plus its subheader:

2> if more than one LCG has data available for transmission in the TTI where the BSR is transmitted: report truncated BSR of the LCG with the highest priority logical channel with data available for transmission;

2> else report short BSR.

1> else if the number of remaining padding bits after the BSR reported for D2D transmission is equal to or larger than the size of the long BSR plus its subheader, report long BSR.

According to an embodiment of the present invention, if the buffer status reporting procedure determines that at least one BSR has been triggered and not cancelled:

1> if the UE has UL resources allocated for new transmission for this TTI:

2> instruct the multiplexing and assembly procedure to generate the BSR MAC CE(s);

2> start or restart periodicBSR-Timer except when all the generated BSRs are truncated BSRs, if the BSR MAC CE(s) contains a BSR for uplink transmission over Uu;

2> start or restart retxBSR-Timer, if the BSR MAC CE(s) contains a BSR for uplink transmission over Uu;

2> start or restart periodicD2DBSR-Timer except when all the generated BSRs are truncated BSRs, if the BSR MAC CE(s) contains a ProSe BSR;

2> start or restart retxD2DBSR-Timer, if the BSR MAC CE(s) contains a ProSe BSR.

1> else if a regular BSR has been triggered (either for uplink transmission or for D2D transmission):

2> if an uplink grant is not configured or the regular BSR was not triggered due to data becoming available for uplink transmission for a logical channel for which logical channel SR masking (logicalChannelSR-Mask) is setup by upper layers, or if a D2D scheduling assignment is not configured (i.e. not granted) or the regular BSR for ProSe was not triggered due to data becoming available for D2D transmission for a D2D logical channel for which logical channel SR masking (logicalChannelSR-Mask) is setup by upper layers:

3> a SR shall be triggered.

According to an embodiment of the present invention, a MAC PDU may contain at most one MAC BSR CE for uplink transmission over Uu and at most one MAC BSR CE for D2D transmission, even when multiple events trigger a BSR by the time a BSR can be transmitted in which case the regular BSR and the periodic BSR shall have precedence over the padding BSR. If a MAC PDU can only accommodate one MAC BSR CE, a BSR triggered for uplink transmission shall have precedence over a ProSe BSR, except the case that the BSR reflects buffer status of one or more D2D logical channels corresponding to public safety transmission or V2X transmission or except the case that the BSR reflects buffer status of a D2D logical channel with the highest logical channel priority (either among all D2D logical channels or among all logical channels for both Uu and D2D). If a ProSe BSR reflects buffer status of one or more D2D logical channels corresponding to public safety transmission or V2X transmission, or if a BSR triggered for D2D transmission reflects buffer status of a D2D logical channel with the highest logical channel priority, the ProSe BSR shall have precedence over any BSR triggered for uplink transmission over Uu.

Accordingly, in case that multiple BSRs have been triggered, if a MAC PDU can only accommodate one MAC BSR CE, and if a ProSe BSR reflects either buffer status of a D2D logical channel corresponding to public safety transmission or V2X transmission or buffer status of a D2D logical channel with the highest logical channel priority (either among all D2D logical channels or among all logical channels for both Uu and D2D), the MAC PDU accommodates the BSR while not accommodate any other BSRs triggered for either uplink transmission or D2D transmission. Alternatively, if the D2D logical channel corresponding to public safety transmission or V2X transmission has a lower logical channel priority than a logical channel configured for transmission over Uu (i.e. Uu logical channel), a BSR reflecting buffer status of the Uu logical channel shall have precedence over a BSR reflecting buffer status of the D2D logical channel.

The UE may restart retxBSR-Timer upon indication of a grant for transmission of new data on any UL-SCH.

According to an embodiment of the present invention, all BSRs triggered for uplink transmission over Uu may be canceled in case the UL grant(s) in this subframe can accommodate all pending data available for transmission but is not sufficient to additionally accommodate the BSR MAC CE plus its subheader. All BSRs triggered for uplink transmission over Uu may be canceled when a BSR triggered for uplink transmission is included in a MAC PDU for transmission. All ProSe BSRs may be canceled in case the D2D scheduling assignment(s) for a (corresponding) D2D scheduling period can accommodate all pending data available for D2D transmission. All ProSe BSRs may be canceled when a BSR triggered for D2D transmission is included in a MAC PDU to be transmitted (to eNB) in uplink.

It may be assumed that a transport block containing a PDU from a D2D logical channel can be transmitted every D2D-TTI. One D2D scheduling period may consist of one or more D2D-TTIs. One D2D scheduling assignment may indicate one or more D2D transmissions occurring within one D2D scheduling period. One D2D scheduling period may have a single transmission or multiple repetitions of the same D2D scheduling assignments. The D2D scheduling assignment may be transmitted at the beginning of a D2D scheduling period and optionally within a D2D scheduling period.

The UE may transmit at most one regular/periodic BSR for uplink transmission and at most one regular/periodic BSR for D2D transmission in a TTI. If the UE is requested to transmit multiple MAC PDUs in a TTI, it may include a padding BSR in any of the MAC PDUs which do not contain a regular/periodic BSR. For BSRs triggered for uplink transmission over Uu, all BSRs transmitted in a TTI always reflect the buffer status after all MAC PDUs for uplink transmission have been built for this TTI. Each LCG shall report at the most one buffer status value per TTI and this value shall be reported in all BSRs reporting buffer status for this LCG. For ProSe BSRs, all BSRs transmitted in a TTI always reflect the buffer status after all MAC PDUs for D2D transmission have been built until this TTI (including this TTI). Each LCG shall report at the most one buffer status value per D2D-TTI or per D2D scheduling period and this value shall be reported in all D2D-BSRs reporting buffer status for this LCG. A padding BSR may be not allowed to cancel a triggered regular/periodic BSR. A padding BSR may be triggered for a specific MAC PDU only and the trigger may be cancelled when this MAC PDU has been built.

Meanwhile, a logical channel priority may be configured not only for a logical channel over Uu, but also for a logical channel over D2D (i.e. D2D logical channel). Hence, priorities of logical channels over Uu may be compared with D2D logical channels based on values of their logical channel priorities. The network may configure priorities of logical channels configured for transmissions over Uu, and optionally priorities of D2D logical channels. If the network does not configure priorities of D2D logical channels, or if a UE is in RRC_IDLE or out of network coverage, the UE may autonomously determine priorities of its own D2D logical channels. The UE may inform other UEs about the priorities of D2D logical channels, e.g. by sending/broadcasting D2D scheduling assignment including the priorities of D2D logical channels or by sending/broadcasting D2D control message, such as MAC CE or RRC/NAS message, including the priorities D2D logical channels to other UEs.

Figure 16:
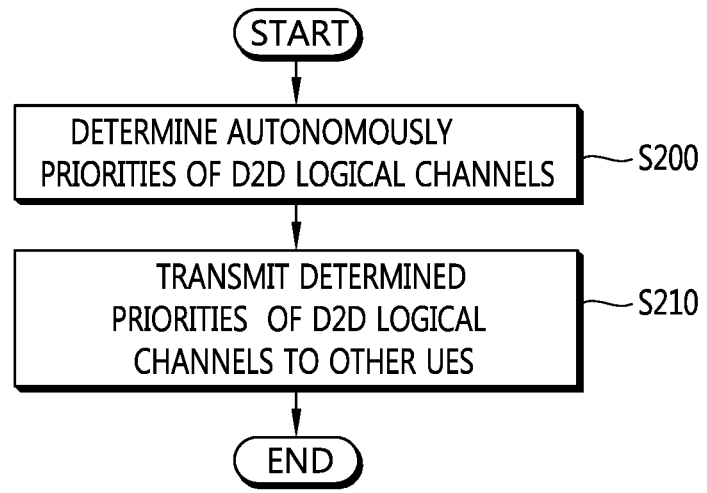
FIG. 16 shows an example of a method for determining priorities of D2D logical channels according to an embodiment of the present invention.

FIG. 16 shows an example of a method for determining priorities of D2D logical channels according to an embodiment of the present invention. In step S200, the UE determines autonomously priorities of D2D logical channels, if the network does not configure priorities of D2D logical channels, or if a UE is in RRC_IDLE or out of network coverage. In step S210, the UE transmits the determined priorities of D2D logical channels to other UEs.

According to an embodiment of the present invention, BSR MAC CE may be alternately defined. The BSR MAC CE may consist of short BSR and truncated BSR format including one LCG ID field and one corresponding buffer size field, as described above in FIG. 13. Buffer status of D2D logical channels belonging to D2D-LCG may be relected in this short/truncated BSR, so that the UE includes a D2D-LCG ID in the LCG ID field and buffer status of D2D logical channels in the corresponding buffer size field. If short/truncated BSR is configured by the network for D2D transmission, the network may assign at least one LGC ID to a group of D2D logical channels (i.e. D2D-LCG ID). If short/truncated BSR is configured by the UE, the UE may indicate to the network that a certain value of LCG ID is assigned to a group of D2D logical channels.

The BSR MAC CE may further consist of long BSR format 1 including four buffer size fields, corresponding to D2D-LCG IDs #0 through #3, as described above in FIG. 14. If the UE supports D2D transmission, one or more buffer size fields may be replaced by D2D-LCG(s), e.g. by network configuration. The BSR MAC CE may further consist of long BSR format 2 including four buffer size fields, corresponding to LCG IDs #0 through #3 for transmission over Uu and at least one buffer size fields, corresponding to one D2D-LCG. More than four buffer size fields may be configured by the network or the UE.

The UE may use either long BSR format 1 with four buffer size fields or long BSR format 2 with more than four buffer size fields. The number of buffer size fields for long BSR format 2 may be either configured by the network or autonomously configured by the UE which indicates that long BSR format and the number of buffer size fields to the network. If long BSR format 1 is configured by the network for D2D transmission, the network may assign at least one LGC ID to a group of D2D logical channels (i.e. D2D-LCG ID). If long BSR format 1 is configured by the UE, the UE may indicate to the network that a certain value of LCG ID is assigned to a group of D2D logical channels. Alternatively, a new ProSe BSR MAC CE may be newly defined. In this case, values of LCID may assigned to the ProSe BSR MAC CE for short/truncated BSR format and long BSR format, as shown in Table 3.

TABLE 3

| Index | LCID values |
| --- | --- |
| 00000 | CCCH |
| 00001-01010 | Identity of the logical channel |
| 01011-10101 | Reserved |
| 10110 | Truncated ProSe BSR |
| 10111 | Short ProSe BSR |
| 11000 | Long ProSe BSR (format 2) |
| 11001 | Extended Power Headroom Report |
| 11010 | Power Headroom Report |
| 11011 | C-RNTI |
| 11100 | Truncated BSR |
| 11101 | Short BSR |
| 11110 | Long ProSe BSR (format 1) |
| 11111 | Padding |

Referring to Table 3, LCID values for the truncated/short/long (format 1/2) ProSe BSR are newly defined.

The fields LCG ID and buffer size are defined as follow:
LCG ID: The logical channel group ID field identifies the group of logical channel(s) which buffer status is being reported. The LCG ID field can include a value of D2D-LCG ID to identify the group of D2D logical channel(s);
Buffer size: The buffer size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. If extendedBSR-Sizes is not configured, the values taken by the buffer size field are shown in Table 1 above. If extendedBSR-Sizes is configured, the values taken by the buffer size field are shown in Table 2 above.

The buffer size field may also identify the total amount of data available across all D2D logical channels of a D2D logical channel group after all MAC PDUs for the D2D-TTI or for the D2D scheduling period have been built. The amount of data may be indicated in number of bytes. It may include all D2D data that is available for transmission in the RLC layer and in the PDCP layer. The size of the RLC and MAC headers are not considered in the buffer size computation.

Figure 17:
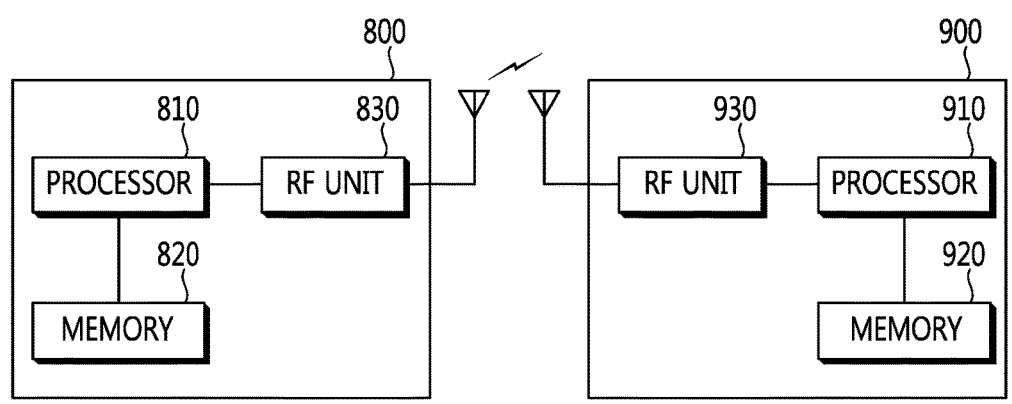
FIG. 17 shows a wireless communication system to implement an embodiment of the present invention.

FIG. 17 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for configuring, by a user equipment (UE), a buffer status report (BSR) for a public safety transmission or a vehicle-related (V2X) transmission in a wireless communication system, the method comprising:
configuring, by the UE, a device-to-device (D2D) logical channel corresponding to the public safety transmission or the V2X transmission;
triggering, by the UE, a proximity-based services (ProSe) BSR for the D2D logical channel; and accommodating, by the UE, the triggered ProSe BSR in a media access control (MAC) protocol data unit (PDU) if the MAC PDU can accommodate only one BSR MAC control element (CE).

2. The method of claim 1, wherein a highest priority is assigned to the D2D logical channel corresponding to the public safety transmission or the V2X transmission.

3. The method of claim 1, wherein the ProSe BSR reflects a buffer status of the D2D logical channel corresponding to the public safety transmission or the V2X transmission.

4. The method of claim 1, wherein the ProSe BSR is used to provide the network with information about amount of data available for D2D transmission.

5. The method of claim 1, wherein the V2X transmission includes at least one of a vehicle-to-vehicle (V2V) transmission, a vehicle-to-pedestrians (V2P) transmission, or a vehicle-to-infrastructure (V2I) transmission.

6. The method of claim 1, wherein the one BSR MAC CE is a short/truncated BSR MAC CE.

7. The method of claim 6, wherein a logical channel group (LCG) identifier (ID) in the short/truncated BSR MAC CE corresponds to a D2D-LCG ID.

8. The method of claim 1, wherein the one BSR MAC CE is either a long BSR MAC CE format 1 or a long BSR MAC CE format 2.

9. The method of claim 1, wherein at least one buffer size field in the long BSR MAC CE format 1 is replaced with D2D-LCG ID.

10. The method of claim 1, wherein a number of buffer size fields in the long BSR MAC CE format 2 is configured by a network or the UE.

11. A user equipment (UE) configured to configure a buffer status report (BSR) for a public safety transmission or a vehicle-related (V2X) transmission in a wireless communication system, the UE comprising:
a radio frequency (RF) unit configured to transmit or receive a radio signal; and
a processor coupled to the RF unit, and configured to:
configure a device-to-device (D2D) logical channel corresponding to the public safety transmission or the V2X transmission;
trigger a proximity-based services (ProSe) BSR for the D2D logical channel; and
accommodate the triggered ProSe BSR in a media access control (MAC) protocol data unit (PDU) if the MAC PDU can accommodate only one BSR MAC control element (CE).

12. The UE of claim 11, wherein a highest priority is assigned to the D2D logical channel corresponding to the public safety transmission or the V2X transmission.

13. The UE of claim 11, wherein the V2X transmission includes at least one of a vehicle-to-vehicle (V2V) transmission, a vehicle-to-pedestrians (V2P) transmission, or a vehicle-to- infrastructure (V2I) transmission.

* * * * *